United States Patent [19]
Warning, Sr.

[11] 3,926,105
[45] Dec. 16, 1975

[54] COOKING APPARATUS
[75] Inventor: Walter B. Warning, Sr., Chicago, Ill.
[73] Assignee: Automation Development & Engineering Corporation, Elk Grove Village, Ill.
[22] Filed: Nov. 23, 1973
[21] Appl. No.: 418,403

Related U.S. Application Data
[63] Continuation of Ser. No. 137,492, April 26, 1971, abandoned.

[52] U.S. Cl................. 99/423; 99/427; 99/443 C; 426/523
[51] Int. Cl.² ............................................ A21B 1/48
[58] Field of Search ............. 99/423, 335, 339, 355, 99/358, 386, 424–425, 427, 443 C, 484, 494; 15/256.51, 256.52, 256.53; 118/13, 123, 261, 415; 222/181; 426/391, 523; 34/31, 108, 110, 113, 119, 121

[56] References Cited
UNITED STATES PATENTS
755,123    3/1904    Flygare .......................... 99/423
2,812,729  11/1957   Bahlsen........................... 99/423 X
2,841,827  7/1958    Crownover ..................... 118/415 X
3,267,877  8/1966    Thiele et al........................... 99/373
3,414,982  12/1968   Oas .............................. 99/484 UX
3,489,106  1/1970    Lostanlen ........................... 99/423
3,628,503  12/1971   Neuhaus ........................ 118/415 X
3,630,140  12/1971   Marrie ................................ 99/423

FOREIGN PATENTS OR APPLICATIONS
53,083    9/1933    Norway................................ 99/427

Primary Examiner—Harvey C. Hornsby
Assistant Examiner—Arthur O. Henderson
Attorney, Agent, or Firm—Edmond T. Patnaude

[57]    ABSTRACT

Cooking apparatus utilizes a pair of oppositely rotating heated drums mounted one above the other for cooking first one side of a batter placed on the upper drum and then cooking the other side as the partially cooked product is transferred onto the lower drum.

5 Claims, 3 Drawing Figures

INVENTOR
WALTER B. WARNING, SR.

BY Fidler, Patnaude & Lays

ATTORNEYS

COOKING APPARATUS

This is a continuation of application Ser. No. 137,492, filed Apr. 26, 1971, now abandoned.

The present invention relates generally to cooking apparatus and more particularly to a device suitable for cooking pancakes and similar food products wherein a viscous batter or dough sheet is first cooked on one side and then on the other.

Pancakes are generally prepared by placing a quantity of pancake batter on a heated griddle or other smooth cooking surface, permitting one side to cook and then flipping the partially cooked pancake over to cook the other side. This procedure has several drawbacks, particularly when used in restaurants, institutions and the like where large quantities of pancakes must be prepared. Moreover, when using this process a great deal of skill is required to make very thin pancakes of the type commonly known as crepes.

An object of the present invention is, therefore, to provide a new and improved method of cooking pancakes and the like.

Another object of the present invention is to provide a new and improved cooking apparatus.

A further object of this invention is to provide a new and improved apparatus for cooking pancakes.

A still further object of this invention is to provide a new and improved apparatus for preparing pancakes of the type having a filling therein.

Briefly, the above and further objects may be realized in accordance with the present invention by providing a pair of oppositely rotatable heated drums mounted one above the other in substantial spaced apart relationship, rotating the drums in opposite directions and feeding a batter onto the cylindrical cooking surface near the top of the upper drum. As the batter is carried from the top of the bottom of the upper drum it is cooked on one side, and the partially cooked product falls onto the cylindrical cooking surface at the top of the bottom drum with the uncooked side in engagement with the cooking surface. As the lower drum rotates the product is cooked from the other side, and the completely cooked product falls from the bottom of the lower drum onto a tray mounted below the bottom drum.

Unless the pancake strip is withdrawn from the unit as it leaves the lower drum it will fold back and forth upon itself, in accord with another feature of this invention, a plurality of spray nozzles are provided for spraying a liquid, semi-liquid or powdered filling or topping onto the cake as it leaves the drum.

Further objects and advantages and a better understanding of the present invention may be had by reference to the following detailed description taken in connection with the accompanying drawing in which.

Figure 1:
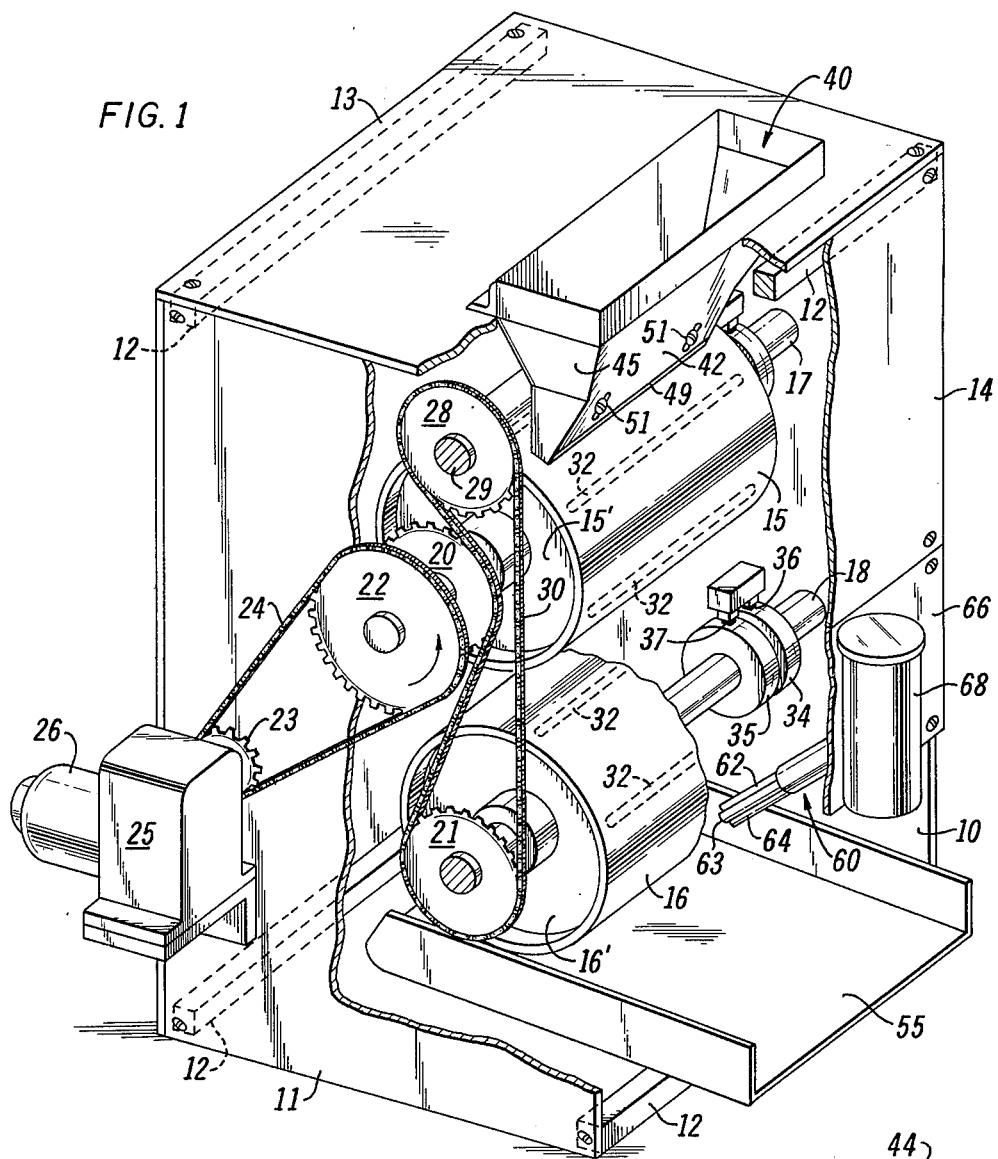
FIG. 1 is an isometric view of cooking apparatus embodying the present invention, portions thereof being broken away to illustrate the internal operating parts of the machine.

Referring now to the drawing and particularly to FIG. 1 thereof, a cooking apparatus includes a housing formed by a pair of rigid side plates 10 and 11 connected together and held in parallel relationship by a plurality of cross brace members 12. A top panel member 13 is removably secured on the upper edges of the side plates 10 and 11. A rear panel is connected over the rear edges of the side plates and a front panel 14 is removably secured over the front edges of the plates 10 and 11. As shown, the front panel 14 is shorter than the plates 10 and 11 to provide a rectangular access openning at the bottom of the front of the unit.

A pair of hollow drums 15 and 16 having end walls 15' and 16' are fixed on a pair of shafts 17 and 18 which are suitably journaled at their ends in the side plates 10 and 11. The upper drum 15 is spaced a substantial distance of about two inches above the lower drum 16 and a pair of identical sprockets 20 and 21 are respectively connected to the shafts 17 and 18. A second sprocket 22 is also mounted on the shaft 17 and is connected to a sprocket 23 by a drive chain 24. The sprocket 23 is mounted on the output shaft of a speed reducer 25 which is driven by an electric motor 26. The speed reducer 25 and the motor 26 are mounted on the side plate 10.

In order to drive the drum 16 at the same speed as the drum 15 but in the opposite angular direction, an idler sprocket 28 is mounted on a shaft 29 journaled in the plate 10 and a drive chain 30 interconnects the sprockets 20, 21 and 28 as shown.

In order to heat the surface of the drums 15 and 16 to the desired cooking temperature, a plurality of resistance type heating elements 32 are mounted within the drums in close proximity to the surface thereof and are electrically connected by conductors (not shown) to slip rings mounted on the respective shafts 17 and 18. As shown in FIG. 1, the slip rings on the shaft 18 are identified by the numerals 34 and 35 and are supplied with electric current through a pair of conventional contact brushes 36 and 37 which are, in turn, suitably connected to a source of electric voltage. Similar slip rings and associated brushes are mounted on the shaft 17 for carrying electric current to the heating element 32 in the drum 13. It will be understood that suitable thermostatic controls are provided for maintaining the temperature of the drums 15 and 16 at the desired values.

Figure 2:
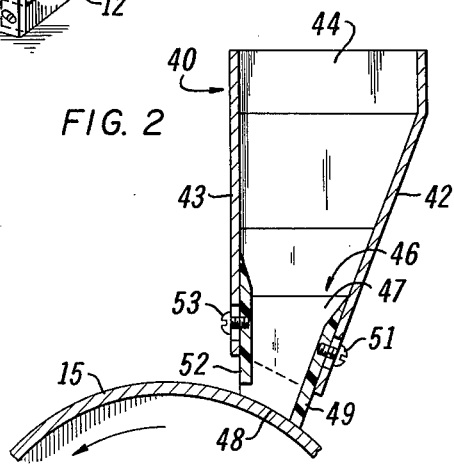
FIG. 2 is a cross-sectional view of the hopper portion of the apparatus of FIG. 1.

A hopper 40 is mounted in an opening in the top panel member 13 and is provided with convergent sides and an open top for feeding batter through the open bottom of the hopper 40 onto the surface of the drum 15. As best shown in FIG. 2, the hopper comprises front and rear wall members 42 and 43 and side members 44 and 45 (FIG. 1). Adjustably mounted at the bottom of the hopper 40 to control the thickness of the pancakes is a feed control assembly 46.

The assembly 46 comprises a pair of identical side wall members 47 each having an arcuate bottom edge 48 conforming to the circumferential surface of the drum 15. A front wall member 49 is fixedly secured to the side wall members 47 and is concave at its lower edge to conform to the circumferential surface of the drum 15. The purpose of the walls 47 and 49 is to prevent the thin liquid batter from flowing downwardly in a direction opposite to the movement of the drum 15 which, in the illustrated embodiment of the invention, moves in a counterclockwise direction as shown in FIG. 2. The walls 47 and 49 are adjustably supported on the hopper wall 42 by any suitable means such as a pair of screws 51 extending through vertical slots in the wall 42 and threadedly secured in the member 49. The thickness of the batter which is flowed onto the drum surface is controlled by a plate 52 which is vertically adjustable on the rear hopper wall 43 on which it is mounted. For this purpose a pair of screws 53 extend through slots in the wall 43 and are threaded into the plate 52. Preferably the members 47, 49 and 52 are all formed of a plastic material such as Teflon to insure a smooth flow of batter onto the drum 15.

It will be noted that the hopper 44 is located below the upper extremity of the drum 15 so that the batter is partially cooked before being carried in a downward direction by the drum 15. Accordingly, the freshly fed batter travels in a substantially horizontal direction for a sufficient time to reach a self-supporting state before being carried by the drum 15 through a substantial downward angle. In this manner a pancake of relatively uniform thickness is provided.

Figure 3:
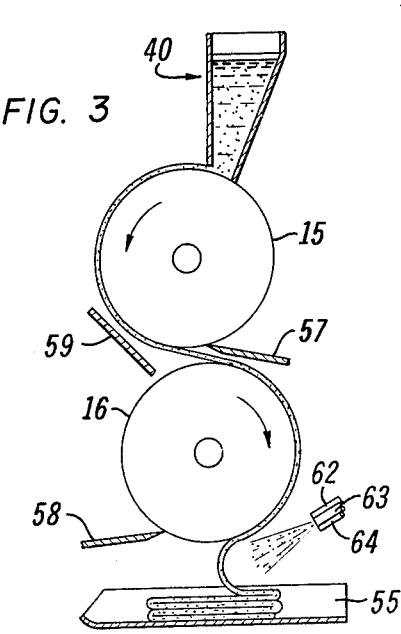
FIG. 3 is a schematic side elevational view of the cooking apparatus of FIG. 1 in operation showing the manner in which a continuous pancake strip is cooked with the apparatus of the present invention.

As best shown in FIG. 3, as the upper drum 15 rotates in a counterclockwise direction the lower surface of the pancake which is in engagement with the heated cooking surface of the drum 15 is cooked as it is carried in an arcuate path by the drum 15. Shortly before the cake reaches the bottom extremity of the drum 15 it falls by its own weight from the drum 15 onto the lower drum 16. The drum 16 is offset from the upper drum 15 relative to the vertical so that the partially cooked pancake from the drum 15 falls onto the upwardly traveling surface of the drum 16. No breaking of the cake thus occurs. As the cake falls onto the lower drum 16 the surface of the cake which was remote from the cooking surface of the drum 15 falls directly onto the cooking surface of the lower drum 16. As the pancake now travels with the rotating drum 16 it is cooked from the other side and falls from the bottom of the drum 16 onto a collector tray 55 which is removably mounted in the housing 10. As shown in FIG. 3 if the pancake strip is not continually removed by the operator from beneath the drum 16 it will fold back-and-forth on itself under the drum 16 as illustrated in FIG. 3.

If the drums 15 and 16 are provided with smooth cooking surfaces and are kept clean, the pancake will drop by gravity from the drum 15 onto the drum 16 and from the drum 16 onto the tray 55. However, to insure that such transfer takes place in the event that the drums become dirty or for some other reason the product does not fall by gravity from the drums 15 and 16, a pair of scraper blades 57 and 58 are provided. The blade 57 is mounted for engagement with the surface of the drum 15 directly above the axis of rotation of the drum 16 and the blade 58 is mounted at about the 225° position on the drum 16 as illustrated in FIG. 3. In order to insure that the product initially feeds from the upper drum 15 to the lower drum 16, a plate 59 is mounted below the drum 15 to guide the partially cooked product onto the drum 16 should it drop too soon from the upper drum 15. Preferably, the plate 59 is a Teflon coated metal member to inhibit sticking of the product thereto.

In accordance with another aspect of the present invention, means for automatically applying a topping or filling to the cooked pancake is provided. This means comprises a plurality of spray guns 60 having a plurality of spray nozzles 62, 63 and 64 arranged in a cluster and directed toward a location just below the lower drum 16. The spray guns 60 are mounted on a removable panel 66 fastened to the side plates 10 and 11 below the front panel 14, and the guns are respectively connected to a plurality of canister type hoppers 68 (only one being shown) mounted on the front of the panel 66 for convenient access thereto for filling and cleaning. Ordinarily, one of the guns 60 sprays liquefied butter or margarine, another sprays a finely powdered sugar and another sprays a more viscous filling such as a fruit preserve. It will be understood, however, that other fillings and/or toppings may be used as desired and the guns 60 may be operated individually or simultaneously. For example, butter may be sprayed from one gun simultaneously with the spraying of maple syrup from another gun. Such spray guns and the controls therefor are well known and are not, therefore, described herein.

In the illustrated embodiment of the invention the drums 15 and 16 are electrically heated. It will be understood, however, that other means of heating such, for example, as by the use of steam or gas flame maybe used if desired. Moreover, in the illustrated apparatus a relatively continuous rectangular strip of the cooked pancake product is provided. However, by the use of other hopper constructions and intermittent feeding of the batter, conventional, generally circular pancakes may be cooked with this apparatus. Moreover, using other hopper arrangements such uncooked products as dough may be fed onto the upper drum 15.

While the surface temperatures of the drums 15 and 16 and the speed of rotation may be varied to some extent, it has been found that a surface temperature on both drums of 375° to 400°F. and a speed of rotation of 2 to 6 r.p.m. on drums having a diameter of 10 inches and formed of aluminum provide a very satisfactory pancake product. If desired the surfaces of the drums 15 and 16 may be coated with Teflon although it has been found that the pancakes do not stick to the smooth aluminum surface.

While the present invention has been described in connection with particular embodiments thereof, it will be understood that those skilled in the art may make many changes and modifications without departing from the true spirit and scope thereof. Accordingly, the appended claims are intended to cover all such changes and modifications as fall within the true spirit and scope of the present invention.

What I claim is:

1. Apparatus for cooking pancakes, comprising
a housing,
a pair of drums each having an external cylindrical cooking surface thereon,
means rotatably mounting said drums in mutually parallel spaced apart relationship one above the other within said housing,
means disposed within said drums for heating said cooking surfaces to a pancake cooking temperature,
motor means for rotating said drums in opposite directions at the same circumferential speed,
feed means mounted above the upper one of said drums having a fill opening accessible from outside said housing for feeding an uncooked liquid pancake batter directly onto the upper portion of the cooking surface of said upper one of said drums,
said speed being selected in combination with the cooking temperature of said drums such that said batter is cooked on one side on the upper drum and then falls by gravity onto the lower drum with the other side in contact with the lower drum to cause said other side to be cooked, and means disposed below the lower one of said drums for receiving the completely cooked pancakes as they fall by gravity from said lower one of said drums, whereby said batter is cooked from one side on the upper drum and then falls by gravity onto the lower drum where the batter is cooked from the other side.

2. Apparatus according to claim 1 wherein the axes of rotation of said drums are mutually offset relative to the vertical.

3. Apparatus according to claim 1 wherein said feed means comprises a hopper having a feed orifice offset relative to the vertical from the axis of rotation of the upper one of said drums to feed said liquid batter onto the upwardly moving cooking surface on the upper drum.

4. Apparatus according to claim 3 wherein said feed means further comprises an elongated wall member having a lower edge extending parallel to the axis of rotation of the upper drum and engaging the cooking surface of said upper drum at a location where said surface is moving in an upward direction.

5. Apparatus according to claim 1 wherein said cooking surfaces are heated to a temperature in the range of 375° to 400°F and said cooking surfaces travel at a speed in the range of about 60 to 180 inches per minute.

* * * * *